United States Patent
Khalsa et al.

(10) Patent No.: US 8,874,658 B1
(45) Date of Patent: Oct. 28, 2014

(54) METHOD AND APPARATUS FOR SIMULATING END USER RESPONSES TO SPAM EMAIL MESSAGES

(75) Inventors: Gurujiwan Khalsa, Berkeley, CA (US); Dylan Morss, Pleasant Hill, CA (US)

(73) Assignee: Symantec Corporation, Cupertino, CA (US)

( * ) Notice: Subject to any disclaimer, the term of this patent is extended or adjusted under 35 U.S.C. 154(b) by 2478 days.

(21) Appl. No.: 11/127,813

(22) Filed: May 11, 2005

(51) Int. Cl.
*G06F 15/16* (2006.01)

(52) U.S. Cl.
USPC ........................................................ 709/206

(58) Field of Classification Search
CPC ..... G06Q 10/107; H04L 51/12; H04L 12/585
USPC ........................................................ 709/206
See application file for complete search history.

(56) References Cited

U.S. PATENT DOCUMENTS

| | | | | |
|---|---|---|---|---|
| 6,052,709 A * | 4/2000 | Paul | | 709/202 |
| 6,449,634 B1 * | 9/2002 | Capiel | | 709/206 |
| 6,615,241 B1 * | 9/2003 | Miller et al. | | 709/206 |
| 6,654,787 B1 * | 11/2003 | Aronson et al. | | 709/206 |
| 6,732,149 B1 * | 5/2004 | Kephart | | 709/206 |
| 6,772,196 B1 * | 8/2004 | Kirsch et al. | | 709/206 |
| 6,895,438 B1 * | 5/2005 | Ulrich | | 709/227 |
| 6,912,571 B1 * | 6/2005 | Serena | | 709/224 |
| 6,941,348 B2 * | 9/2005 | Petry et al. | | 709/206 |
| 7,092,992 B1 * | 8/2006 | Yu | | 709/206 |
| 7,219,299 B2 * | 5/2007 | Fields et al. | | 715/205 |
| 7,620,690 B1 * | 11/2009 | Castelli | | 709/206 |
| 7,634,570 B2 * | 12/2009 | Paya et al. | | 709/227 |
| 7,757,288 B1 * | 7/2010 | Khalsa | | 726/24 |
| 8,135,790 B1 * | 3/2012 | Castelli | | 709/206 |
| 8,145,710 B2 * | 3/2012 | Cowings et al. | | 709/205 |
| 2002/0198950 A1 * | 12/2002 | Leeds | | 709/206 |
| 2004/0006600 A1 * | 1/2004 | Miller et al. | | 709/206 |
| 2004/0064734 A1 * | 4/2004 | Ehrlich | | 713/201 |
| 2004/0167968 A1 * | 8/2004 | Wilson et al. | | 709/207 |
| 2004/0177120 A1 * | 9/2004 | Kirsch | | 709/206 |
| 2004/0181598 A1 * | 9/2004 | Paya et al. | | 709/227 |
| 2005/0015626 A1 * | 1/2005 | Chasin | | 713/201 |
| 2005/0060643 A1 * | 3/2005 | Glass et al. | | 715/501.1 |
| 2005/0108639 A1 * | 5/2005 | Fields et al. | | 715/531 |
| 2005/0204005 A1 * | 9/2005 | Purcell et al. | | 709/206 |
| 2005/0204006 A1 * | 9/2005 | Purcell et al. | | 709/206 |
| 2006/0015564 A1 * | 1/2006 | Angelica | | 709/206 |
| 2006/0036748 A1 * | 2/2006 | Nusbaum et al. | | 709/228 |
| 2006/0253597 A1 * | 11/2006 | Mujica | | 709/229 |
| 2006/0265498 A1 * | 11/2006 | Turgeman et al. | | 709/225 |
| 2007/0294352 A1 * | 12/2007 | Shraim et al. | | 709/206 |
| 2011/0197114 A1 * | 8/2011 | Martin | | 715/205 |

* cited by examiner

*Primary Examiner* — Rupal Dharia
*Assistant Examiner* — Marcus McKenzie
(74) *Attorney, Agent, or Firm* — Meyertons, Hood, Kivlin, Kowert & Goetzel, P.C.

(57) ABSTRACT

A method and system for simulating end user responses to spam email messages are described. In one embodiment, the method includes receiving a probe email message indicative of spam and identifying a seeding component in the probe email message. The method further includes activating the seeding component utilizing a selected email address. The selected email address may then appear to the originator of the probe email message as an active email account.

19 Claims, 5 Drawing Sheets

METHOD AND APPARATUS FOR SIMULATING END USER RESPONSES TO SPAM EMAIL MESSAGES

FIELD OF THE INVENTION

The present invention relates to filtering electronic mail (email); more particularly, the present invention relates to simulating end user responses to spam email messages.

BACKGROUND OF THE INVENTION

Spam, an electronic version of junk mail, is unsolicited email on the Internet. A filter, on the other hand, is a piece of software that is capable of identifying an email message as spam and blocking or redirecting delivery of a spam message. Some existing methods for generating spam filters rely on collecting spam email messages, processing the messages, and creating filtering rules to be later used to detect spam email. An ability to develop effective filters may be affected by the quantity and quality of spam messages that are available for processing. It is therefore desirable to identify methods that produce increased amount of spam messages that can be used in creating anti-spam filters.

SUMMARY OF THE INVENTION

A method and system for simulating end user responses to spam email messages are described. According to one aspect, the method includes receiving a probe email message indicative of spam and identifying a seeding component in the probe email message. The method further includes activating the seeding component utilizing a selected email address. The selected email address may then appear to the originator of the probe email message as an active email account.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Email address lists available to spammers usually include active addresses, as well as inactive addresses. Some techniques, utilized by spammers to determine whether a particular email address (a target address) is active, include inserting into the body of an email message a web beacon or an unsubscribe link.

An unsubscribe link is a uniform resource locator (URL) that is usually attached to a Common Gateway Interface (CGI) script, which will process data returned when the link is activated. When an email recipient clicks on an unsubscribe link, the data in the URL is sent to the originator of the email message. The main piece of the URL data in these links is usually the recipient's email address, which lets the sender know that that particular email address is active. When an end user clicks the unsubscribe link, the sender receives a confirmation that this is a live end user with a valid email address that does not want to receive mailings anymore. Unfortunately, in the case of spammers, this usually translates into an invitation to spam the recipient of the message even more.

A web beacon is a small transparent or otherwise obscured graphic image such that it is effectively invisible. Typically, web beacons in email messages carry a unique id that encodes the recipient's email address or other personally identifying information. The recipient's email address is active status is relayed to the sender of an email message when the email message is viewed by the recipient, which effectively notifies the sender, who may be a spammer, that this particular target email account is active.

Once the active status of a particular address is confirmed, the confirmed address may become the target of an increased volume of spam messages.

Embodiments of the present invention use the above techniques employed by spammers to attract increased amount of spam to a network of fictitious probe email addresses so that more spam messages are available at an anti-spam facility for processing.

In particular, when a spam message is received at a probe email address, the message is examined to detect a seeding component. A seeding component refers to a data component inserted into the body of an email message to determine whether a target address is active. A seeding component may be, for example, a web beacon or an unsubscribe link. If the seeding component is identified, an action is performed to cause a response to be sent to the spam sender, giving the spam sender an impression that the target address is associated with an active email account. As a result, an increased volume of spam may be sent to the probe email address, which, in turn, provides an anti-spam facility with more spam samples that can be used for generating anti-spam filters.

Figure 1:
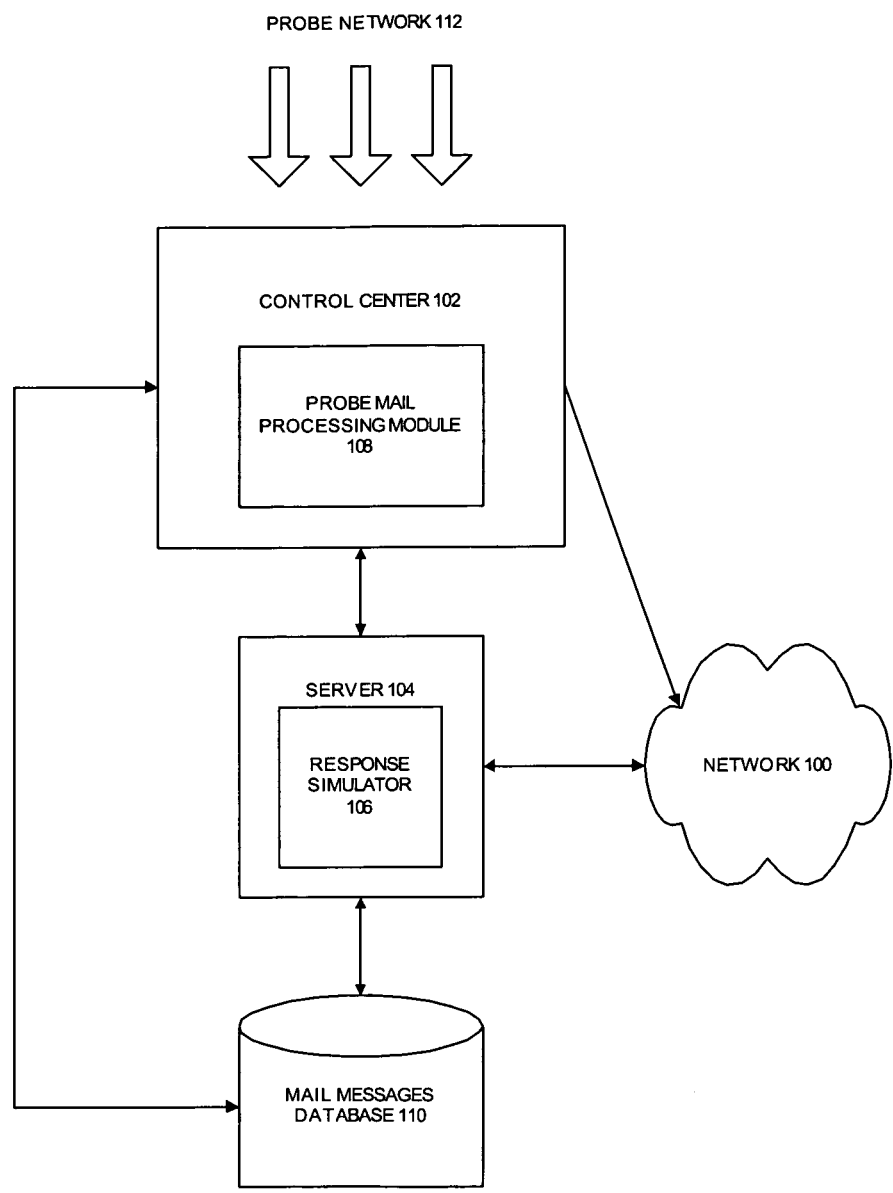
FIG. 1 is a block diagram of one embodiment of a system for simulating end user responses to spam email messages.

FIG. 1 is a block diagram of one embodiment of a system for simulating end user responses to spam email messages. The system includes a control center 102 coupled to a communications network 100 such as a public network (e.g., the Internet, a wireless network, etc.) or a private network (e.g., LAN, Intranet, etc.). The control center 102 is an anti-spam facility that is responsible for analyzing messages indicative of spam, developing filtering rules for detecting spam, and distributing the filtering rules to customers.

An email message may be indicative of spam because it was collected via a "probe network" 112. In one embodiment, the probe network is formed by fictitious probe email addresses specifically selected to make their way into as many spammer mailing lists as possible. The fictitious probe email addresses may be selected to appear high up on spammers' lists in order to receive spam mailings early in the mailing process (e.g., using the email address "aardvark@aol.com" ensures relatively high placement on an alphabetical mailing list). The fictitious probe email addresses may include, for example, decoy accounts and expired domains. In addition, a certain percentage of assignable email addresses offered by an Internet Service Provider (ISP) or private network may be reserved for use as probe email addresses. The probe network 112 may also receive email identified as spam by end users.

In one embodiment, the control center 102 includes a probe mail processing module 108 that is responsible for identifying spam email messages resulted from distinct spam attacks, generating filters for the distinct spam attacks, and distributing the filters to customers for detection of spam email messages received at the customer sites. The probe mail processing module 108 may also be utilized to identify messages that include a seeding component such as an unsubscribe URL or a web beacon and forward such messages to a response server 104.

The response server 104 includes a response simulator 106 that is capable of activating a seeding component in order to cause the originator of the spam message to receive an indication of an active status of the spam recipient. For example, if the seeding component is a web beacon, the response simulator 106 opens the message containing the web beacon for viewing to simulate an action by a user. This process may be referred to as "pixel seeding." When the message containing the web beacon is opened for viewing, the spam originator receives, via the network 100, a confirmation that the target email address is associated with an active account.

In another example, if the seeding component is an unsubscribe URL, the response simulator 106 simulates an action of an unsubscribe request by a user. This process may be referred to as "remove me seeding." When an unsubscribe URL is activated, the spam originator receives, via the network 100, a confirmation that the target email address is associated with an active email account.

The simulated activity (e.g., the simulated viewing of the message or the simulated unsubscribe request) changes the nature of traffic to the target address (the probe) and is used as a controlled feed into the control center 102 to approximate specific attacks, such as viruses, exploits, or spam attacks of a particular type.

The email messages identified by the probe mail processing module 108 as containing seeding components may be stored in a mail messages database 110, such that the seeding components in those messages may be activated at a later time, within a random or predetermined time period.

In an alternative embodiment, the response simulator 106 is hosted by the control center 102.

Figure 2:
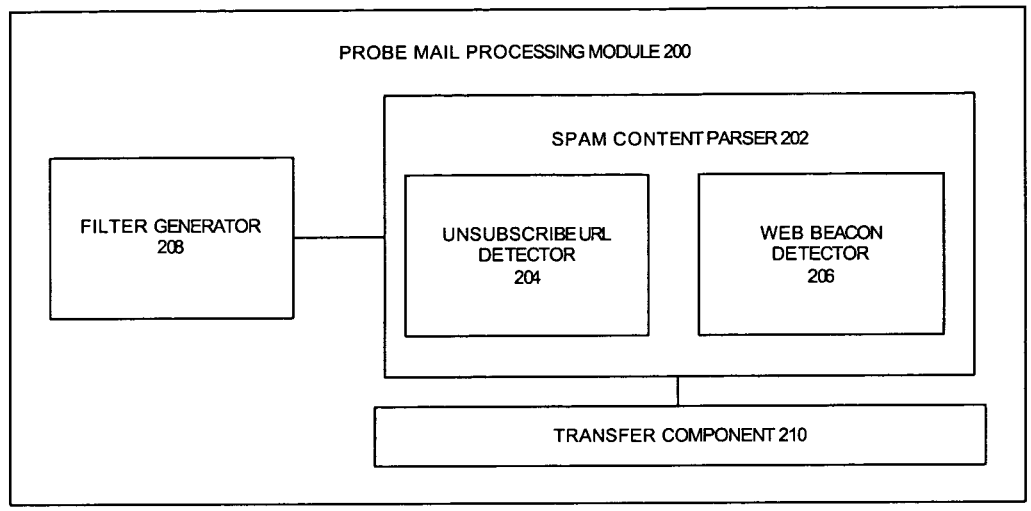
FIG. 2 is a block diagram of one embodiment of a probe mail processing module.

FIG. 2 is a block diagram of one embodiment of a probe mail processing module 200. The probe mail processing module 200 includes a spam content parser 202, a filter generator 208, and a transfer component 210.

A filter generator 208 is responsible for generating filtering rules based on information collected using fictitious probe email addresses.

For example the filter generator 208 may, for example, analyze source header data from the received email messages to identify the network address contained in the source header as the network address of a known spammer, or to generate a mathematical signature (e.g., a checksum) of the spam email body (or portions of the email body), or to identify particular keywords indicative of spam in the subject or body of spam email. Resulting filters may comprise a mathematical signature of a probe email message, a regular expression characterizing a probe email message, one or more URLs extracted from a probe email message, or any other data characterizing probe email messages that resulted from a spam attack. The more data is available to the filter generator 208 for analysis, the more effective anti-spam rules can be generated.

In order to attract more spam to the probe network 112, the probe mail processing module 200 utilizes the spam content parser 202 to identify spam messages containing one or more seeding components, and forwards such messages to the response simulator 106. The spam content parser 202 may detect seeding components of various types including, for example, web beacons and unsubscribe URLs. In one embodiment, the spam content parser 202 includes an unsubscribe URL detector 204 to detect unsubscribe URLs and a web beacon detector 206 to detect web beacons.

The unsubscribe URL detector 204 detects data indicative of a URL in the email message, such as a string similar to that of a URL. For example, the URL string may be detected in a markup language (e.g., HTML) message based on formatting data surrounding the URL string in the message. For example, in the HTML message, the URL string may be formatted as follows:

<a href="http://www.quickinspirations.com">.

The URL string may be detected even if formatting rules were not followed (e.g., the URL string is formatted incorrectly). For example, in HTML, the URL string may be formatted incorrectly as follows:

<a href=http://www.quickinspirations.com>.

The unsubscribe URL detector 204 may further examine the URL for keywords such as "unsubscribe" to identify a URL as an unsubscribe URL. In some embodiments, processing logic identifies an unsubscribe URL by reducing noise in the data indicative of a URL (e.g., by eliminating extraneous information present in the data indicative of the URL).

In an alternative embodiment, when the unsubscribe URL detector 204 detects any URL with a particular characteristic, such message may also be forwarded by the transfer component 210 to the response simulator 106 so that the response simulator 106 automatically activates the URL in order to alert the spammer to the active status of the target recipient.

The web beacon detector 206 is responsible for detecting, in the email message, data indicative of a web beacon, such as a file in the GIF format that is of a small size and having a relatively long file name. When the web beacon detector 206 detects a web beacon in an email message, such message is forwarded by the transfer component 210 to the response simulator 106 so that the response simulator 106 can automatically activate the associated web beacon by simulating the viewing of the message in order to alert the spammer to the active status of the target recipient.

Figure 3:
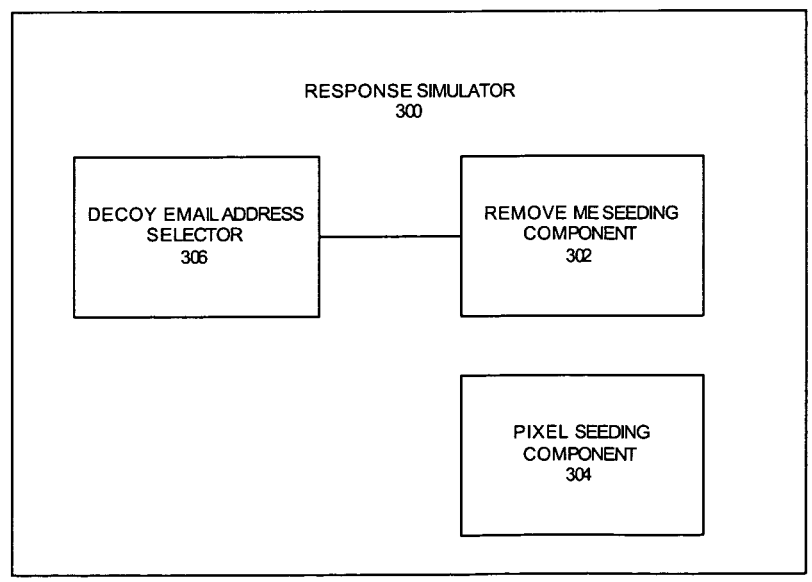
FIG. 3 is a block diagram of one embodiment of a response simulator.

FIG. 3 is a block diagram of one embodiment of a response simulator 300. The response simulator 300 simulates actions for different types of seeding components. In one embodiment, the response simulator 300 includes a remove me seeding component 302 and a pixel seeding component 304. The remove me seeding component 302 is responsible for automatically activating the URL detected by the unsubscribe URL detector 204. The pixel seeding component 304 is responsible for automatically simulating the viewing of the message in order to alert the spammer to the active status of the target recipient.

In one embodiment of the present invention, the remove me seeding component 302, prior to activating the URL detected by the unsubscribe URL detector 204, replaces the recipient's email address present in the URL with one or more decoy email addresses provided by a decoy email address selector 306. The decoy email address selector 306 may generate new email addresses to be used as decoys or select decoy email addresses from inactive (or old) email addresses from the probe network. The decoy email addresses may be selected utilizing, for example, such factors as the origin of an email address, the age of an email address, and previous use of an email address. This way, the decoy addresses are selected such that they are more likely to appear to the originator of the probe email message as being associated with live users.

When the recipient's email address is replaced with a newly generated decoy email address prior to simulating a response, this newly generated email address becomes part of the probe network and is likely to attract spam messages when its status is confirmed as active to the spammer. When an inactive email address is used as a decoy email address, such inactive email address is also likely to attract spam messages when its status is confirmed as active to the spammer. Thus, replacing the recipient's email address associated with a seeding component with one or more decoy email addresses may contribute to the expanding of the probe network.

Figure 4:
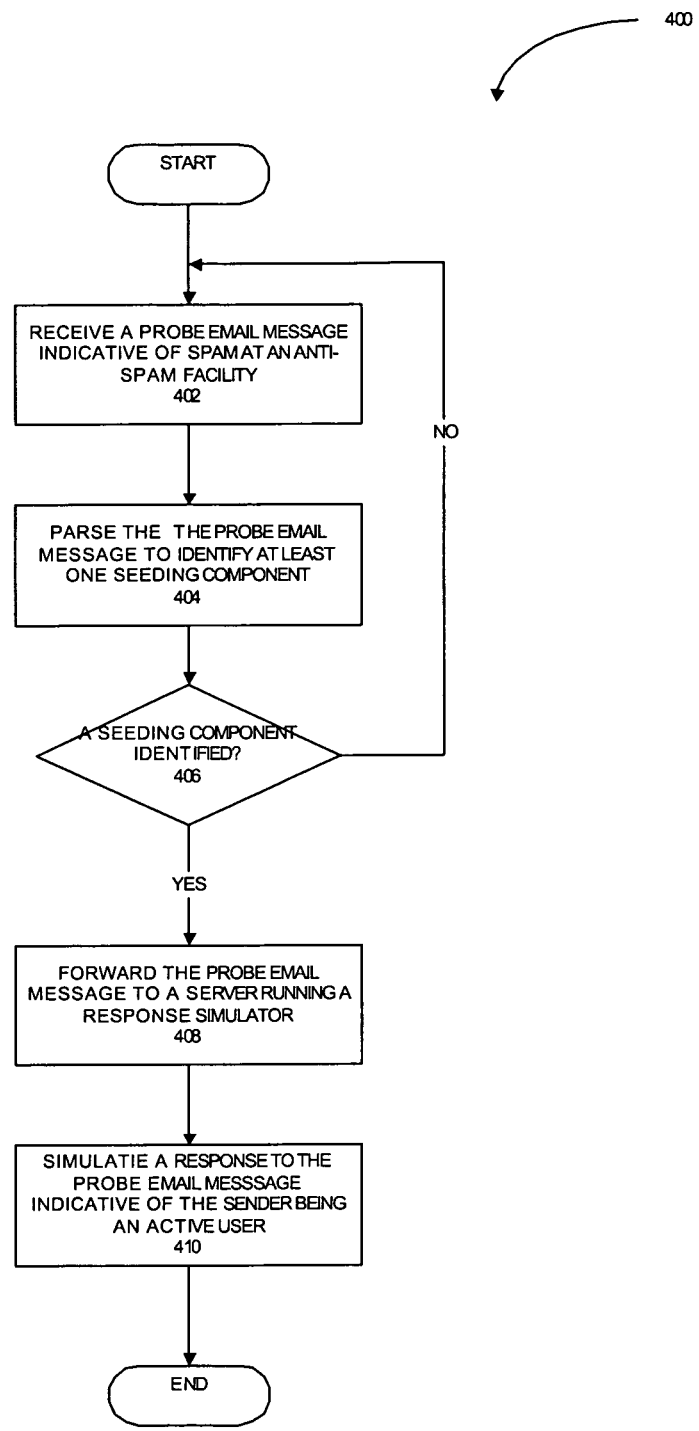
FIG. 4 is a flow diagram of one embodiment of a process for attracting spam email messages to a probe network.

FIG. 4 is a flow diagram of one embodiment of a process 400 for attracting spam email messages to a probe network. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at the control center 102 of FIG. 1. In an alternative embodiment, the processing logic is distributed between the control center 102 and the server 104 of FIG. 1.

Referring to FIG. 4, process 400 begins with processing logic receiving, at the control center 102, a probe email message indicative of spam (processing block 402). A probe email message is considered to be indicative of spam, in one embodiment, if it has been collected via a probe network.

At processing block 404, the spam content parser 202 parses the probe email message to identify at least one seeding component, such as, for example, an unsubscribe URL or a web beacon. If a seeding component is identified at processing block 406, the probe email message is forwarded, at processing block 408, by the transfer component 201 to the response simulator 300, which, in one embodiment, resides at the response server 104.

At processing block 410, the response simulator 300 simulates a response to the probe email message indicative of the sender being an active user.

Figure 5:
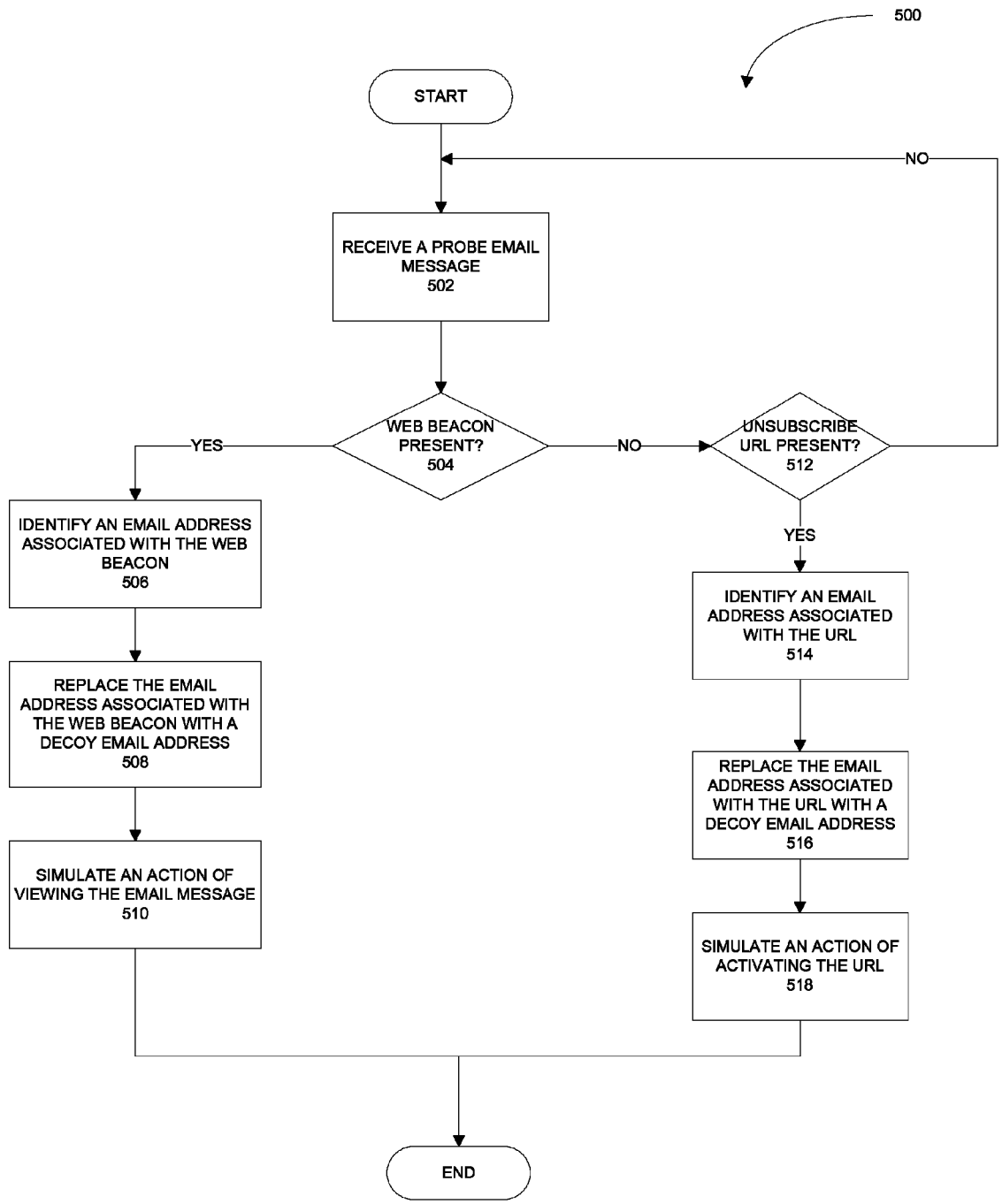
FIG. 5 is a flow diagram of one embodiment of a process for simulating end user responses to spam email messages.

FIG. 5 is a flow diagram of one embodiment of a process 500 for simulating end user responses to spam email messages, which, in one embodiment, corresponds to operations performed within the processing block 410 of FIG. 4. The process 500 begins with processing logic receiving, at the response server 104, a probe email message indicative of spam (processing block 502). The response simulator 106 determines, at processing block 504, whether a web beacon is present in the probe message. A web beacon may be identified, in one embodiment, by parsing the HTML source of the body of the message to detect links to files having characteristics of uniqueness and that are obscured in certain ways. If it is determined that a web beacon is present, the processing logic passes control to the pixel seeding component 304 of the response simulator 300. The pixel seeding component 304 identifies an email address associated with the web beacon (processing block 506). An email address associated with the web beacon, which is typically the recipient's email address, may be identified by examining the name string of the GIF file.

At processing block 510, the pixel seeding component 304 simulates viewing of the email message in order to cause an indication to be sent to the originator of the probe email message. The indication is typically treated by the originator of the probe email message as a confirmation of the recipient's active status. Because the recipient's email address has been replaced with at least one decoy address, at processing block 508, the active status of the decoy address is confirmed with the originator of the spam email message, which may cause more spam messages to be attracted to the decoy email address.

If it is determined, at processing block 504, that a web beacon is not present in the probe email message, the processing logic determines whether an unsubscribe URL is present in the body of the probe email message (processing block 512) and, if so, passes control to the remove me seeding component 302 of the response simulator 300.

The remove me seeding component 302 identifies an email address associated with the web beacon (processing block 514). Once the email address associated with the unsubscribe URL is identified, the remove me seeding component 302 replaces the recipient's email address associated with the unsubscribe URL with a decoy email address (processing block 516). The remove me seeding component 302 utilizes the decoy email address selector 306 to obtain a decoy email address. It will be noted that, in one embodiment, the remove me seeding component 302 may associate a plurality of decoy email addresses with the web beacon.

At processing block 518, the remove me seeding component 302 simulates an activation of the unsubscribe URL in order to cause an unsubscribe request to be sent to the originator of the probe email message. If the originator of the probe email message is a spammer, the unsubscribe request is typically treated by the originator as a confirmation of the recipient's active status. Because the recipient's email address has been replaced with at least one decoy address, the active status of the decoy address is confirmed with the originator of the spam email message, which may cause more spam messages to be attracted to the decoy address.

In one embodiment of the present invention, the method to simulate responses to spam email messages employs one or more obfuscation techniques to make the simulated response appear as a response from a live user. Some obfuscation techniques include utilizing ISP dialup accounts to disassociate the simulated response process from any IP addresses that can be easily traced to the control center 102 or the response server 104.

It will be understood by one of ordinary skill in the art that various techniques other than those described above may be used by embodiments of the present invention to simulate responses to spam email messages.

An Exemplary Computer System

Figure 6:
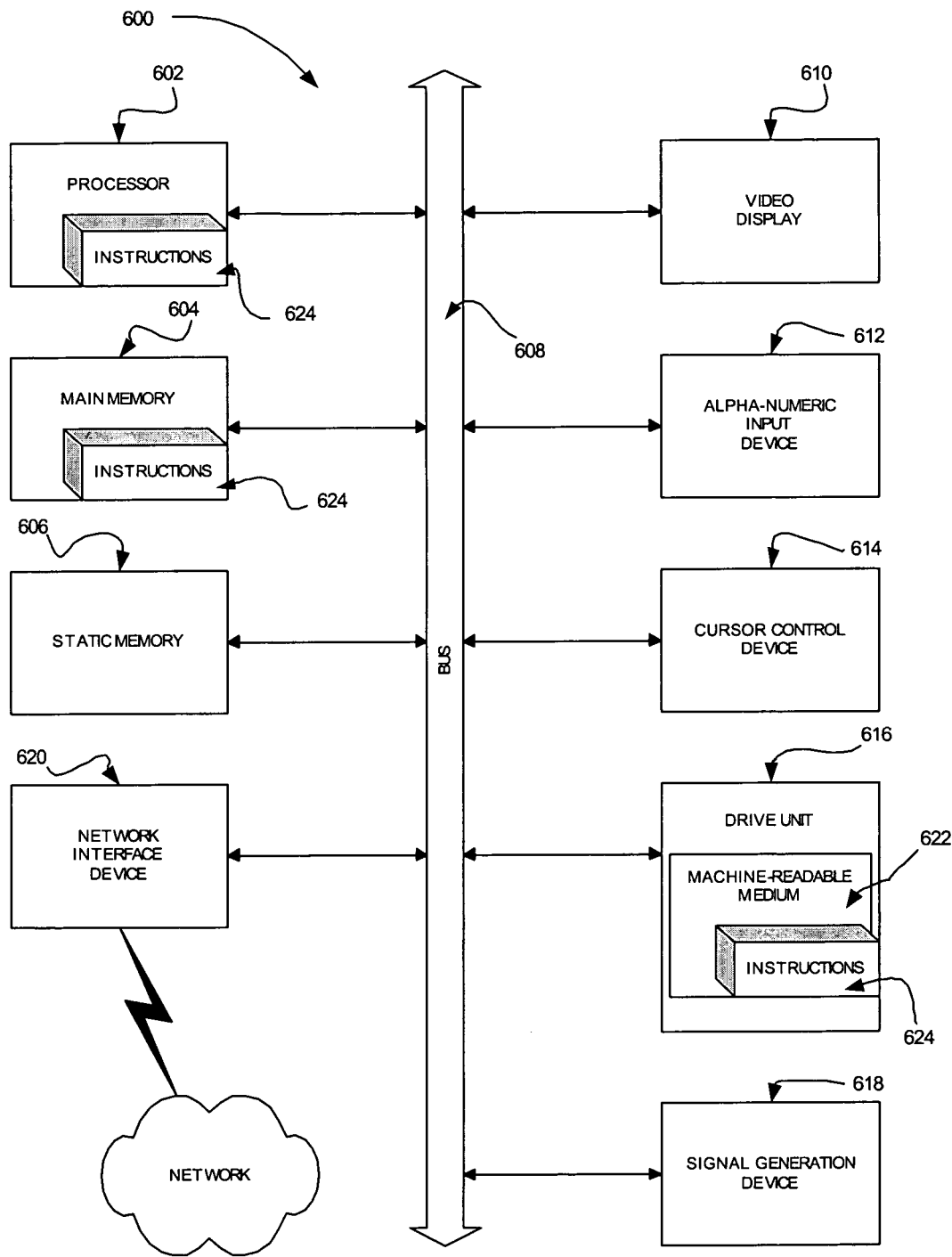
FIG. 6 is a block diagram of an exemplary computer system.

FIG. 6 is a block diagram of an exemplary computer system 600 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, method and apparatus for simulating end user responses to spam email messages have been described. In the following description, numerous details have been set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:
a computer system receiving an email message addressed to a first probe email address;
the computer system determining whether a web beacon is present in the email message;
in response to determining that a web beacon is present in the email message, the computer system identifying the first probe email address in a name string of the web beacon;
the computer system replacing the identified first probe email address in the name string of the web beacon with a second, different probe email address; and
the computer system activating the web beacon, wherein activating the web beacon provides an indication that the second probe email address is active.

2. The method of claim 1, wherein the second probe email address is selected from a plurality of previously utilized probe email addresses.

3. The method of claim 1, wherein the indication is provided to
an originator of the email message.

4. The method of claim 2, wherein the second probe email address is selected based on previous email address use.

5. The method of claim 2, wherein the second probe email address is selected based on email address age.

6. A computer system, comprising:
a processor;
a memory storing program instructions executable to cause the computer system to: receive an email message addressed to a first probe email address;
determine whether a web beacon is present in the email message;
in response to determining that a web beacon is present in the email message, identify the first probe email address in a name string of the web beacon;
replace the identified first probe email address in the name string of the web beacon with a second, different probe email address; and
activate the web beacon, wherein activating the web beacon provides an indication that the second probe email address is active.

7. A non-transitory computer readable medium comprising instructions executable on a processing system to cause said processing system to:
- receive an email message addressed to a first probe email address;
- determine whether a web beacon is present in the email message;
- in response to determining that a web beacon is present in the email message, identify the first probe email address in a name string of the web beacon;
- replace the identified first probe email address in the name string of the web beacon with a second, different probe email address; and
- activate the web beacon, wherein activating the web beacon provides an indication that the second probe email address is active.

8. The non-transitory computer readable medium of claim 7, wherein the indication is provided to an originator of the email message.

9. The non-transitory computer readable medium of claim 7, wherein the second probe email address is selected from a plurality of previously utilized probe email addresses.

10. The non-transitory computer readable medium of claim 9, wherein the second probe email address is selected based on previous email address use.

11. The non-transitory computer readable medium of claim 9, wherein the second probe email address is selected based on email address origin.

12. The non-transitory computer readable medium of claim 9, wherein the second probe email address is selected based on email address age.

13. The method of claim 2, wherein the second probe email address is selected based on email address origin.

14. The method of claim 1, wherein activating the web beacon includes using an ISP dialup account to disassociate the indication from IP addresses that are traceable to the computer system.

15. The system of claim 6, wherein the indication is provided to an originator of the email message.

16. The computer system of claim 6, wherein the second probe email address is selected from a plurality of previously utilized probe email addresses.

17. The computer system of claim 16, wherein the second probe email address is selected based on previous email address use.

18. The computer system of claim 16, wherein the second probe email address is selected based on email address origin.

19. The computer system of claim 16, wherein the second probe email address is selected based on email address age.

\* \* \* \* \*